FINE ATTENUATOR AND PHASE SHIFTER

Filed Aug. 24, 1964 2 Sheets-Sheet 1

United States Patent Office 3,323,080

Patented May 30, 1967

3,323,080

FINE ATTENUATOR AND PHASE SHIFTER

Otto Schweib and John Elliott, Ottawa, Ontario, Canada, assignors to Northern Electric Company Limited, Montreal, Quebec, Canada Filed Aug. 24, 1964, Ser. No. 391,552
5 Claims. (Cl. 333—11)

This invention relates to a microwave circuit which may be used as a phase shifter or as an attenuator, and in particular it relates to a microwave circuit useful as a fine phase shifter or a fine attenuator.

Often in microwave work, for example in various types of measurements, it is desirable to be able to create very small, precisely controllable, increments in attenuation or phase of a signal, or both. Frequently it is desirable to have a device accurately controllable to produce fine increments in attenuation with substantially zero accompanying phase shift.

Accordingly it is an object of the present invention in one of its aspects to provide a circuit which may be used as a fine attenuator with very little incidental phase shift, or which may be used as a fine phase shifter with very little incidental variation in attenuation. It is an object of the present invention in another of its aspects to provide a circuit which may be used as a fine attenuator with substantially zero accompanying phase shift.

The invention accordingly comprises a microwave circuit for producing controlled incremental changes in an output signal thereof, comprising:

(a) Input means for receiving and dividing an input signal, (b) Output means, (c) A pair of transmission paths each having one end coupled to said input means to receive a respective portion of said input signal and each having its other end coupled to said output means for the signals in said paths to combine at said output means as an output signal, (d) One of said transmission paths containing therein first means for modifying the amplitude of the signal in said one path and second means in series with said first means for modifying a selected one of the amplitude and phase of the signal in said one path, at least one of said first and second means being independently variable.

By microwave circuit is meant a circuit which operates at microwave frequencies and the elements of which are most commonly waveguide, coaxial cable, or strip line.

Other objects and advantages of the invention will appear from the following disclosure, the devices illustrated being shown by way of example only while the broad scope of the invention is defined by the appended claims.

Figure 1:
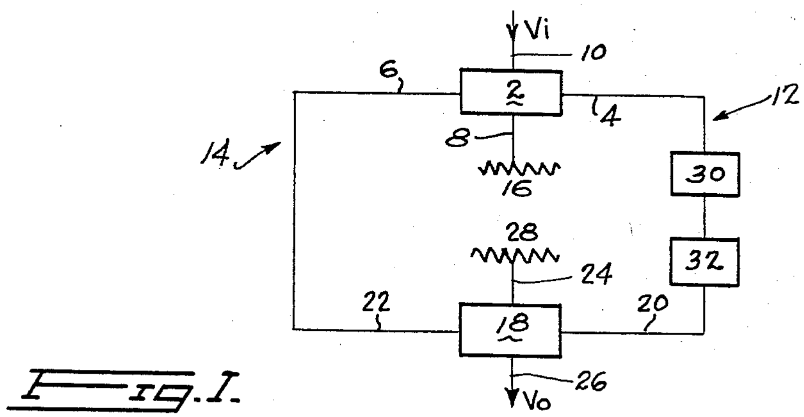
FIGURE 1 is a diagrammatic view of a basic circuit embodying the invention.

Referring first to FIGURE 1, there is shown a basic waveguide circuit for a fine attenuator and a fine phase shifter. Input means for the circuit are provided, comprising a hybrid junction 2 diagrammatically shown here as a magic tee junction having the usual pair of side arms 4 and 6, an H plane arm 8, and an E plane arm 10. Coupled to arm 4 is a transmission path generally indicated at 12, while coupled to arm 6 is another transmission path generally indicated at 14, paths 12 and 14 being shown as of equal physical length. Arm 8 of the input junction is terminated by a matched load 16 and arm 10 is used for supplying an input signal $V_i$ to the circuit.

Output means for the circuit are also provided, comprising another hybrid junction 18 also shown diagrammatically as a magic tee junction and having side arms 20 and 22, an H plane arm 24 and an E plane arm 26. Transmission path 12 is coupled to arm 20 of the output junction while transmission path 14 is coupled to arm 22. Arm 24 of junction 18 is terminated by a matched load 28, and arm 26 supplies an output signal from the circuit.

Connected in transmission path 12 is a preset attenuator 30 for attenuating by a factor A a signal passing through path 12. Also in path 12, connected in series with attenuator 30, is a variable phase shifter 32 for shifting the phase of a signal in path 12 by a variable angle $\theta$. Transmission path 14 provides substantially a direct conducting path between arm 6 of input junction 2 and arm 22 of output junction 18.

The operation of the circuit of FIGURE 1 is as follows. Input signal $V_i$ divides equally in power at input junction 2, one-half of the input power entering transmission path 12 and one half entering transmission path 14. (Arm 16, being terminated by a matched load, absorbs no power.) The signal passing through path 14 suffers substantially no change in amplitude or phase (ignoring changes due solely to the physical length of the path between input junction 2 and output junction 18) so that the part of the output signal in output arm 26 resulting from the signal in transmission path 14 may be represented as $$V_{14}=\frac{V_i}{2}$$

Figure 2:
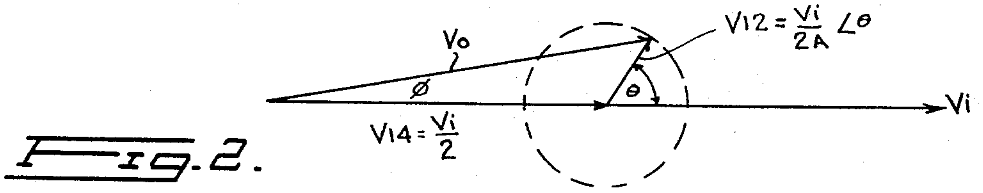
FIGURE 2 is a vector diagram for calculating an output signal of the circuit of FIGURE 1.

This situation is shown in FIGURE 2 which is a vector diagram for calculating the amplitude and phase of the output signal from the circuit.

The signal passing through transmission path 12, however, suffers attenuation by a factor A and a phase shift of angle $\theta$, as previously mentioned. Therefore that part of the output signal due to the signal in path 12 may be represented as $$V_{12}=\frac{V_i}{2A}\angle\theta$$

These two vectors $V_{12}$ and $V_{14}$ are added vectorially to produce a resultant vector $V_o$ having amplitude $V_o$, and phase angle $\phi$, indicative of the amplitude and phase angle of the output signal of the circuit.

The circuit of FIGURE 1 is used as a fine phase shifter or fine attenuator by setting the attenuator 30 (usually so that vector $V_{12}$ is of relatively short length as compared with vector $V_{14}$) and then adjusting phase shifter 32 to vary the angle $\theta$. As vector $V_{12}$ travels in a circle about the tip of vector $V_{14}$, the phase angle $\phi$ and the amplitude of vector $V_o$ vary accordingly.

As is evident from the FIGURE 2 vector diagram, if attenuation A is set relatively high so that the length of vector $V_{12}$ is relatively short compared with that of vectors $V_{14}$ and $V_o$, then changes in orientation of vector $V_{12}$ will only slightly influence vector $V_o$. Thus phase shifter 32 may then be adjusted over a wide range to produce a large change in angle $\theta$, and there will result only a relatively small change in the amplitude and phase angle of output vector $V_o$. Hence the circuit of FIGURE 1 will provide, without critical adjustment, precisely controlled incremental adjustment in output signal amplitude with small accompanying phase shift, or precisely controlled incremental phase shift with small accompanying variation in amplitude.

The range of attenuation and phase shift depends on the length of vector $V_{12}$ (i.e., upon the setting of attenuator 30), as is evident from FIGURE 2. The length of vector $V_o$ varies from a maximum length of $V_{14}+V_{12}$, when angle $\theta$ is zero degrees to a minimum length of $V_{14}-V_{12}$ when angle $\theta$ is 180°. Phase angle $\phi$ has a maximum deviation from zero degrees when angle $\theta$ is slightly greater than 90° in either the positive or negative directions and this maximum deviation depends upon the length of vector $V_{12}$. Thus the circuit may be set for any desired range of attenuation or phase shift by setting attenuator 30 and then adjusted throughout that range by control of phase shifter 32.

It must be realized that the vector diagram of FIGURE 2 is illustrative only as a method for deriving a vector $V_o$ indicative of the phase angle and amplitude of the actual output signal vector of the circuit. The vector diagram is not a representation of signals in transmission paths 12 and 14 of the FIGURE 1 circuit, but provided the impedances at the output arm 26 and in transmission paths 12 and 14 are equal, it does yield a vector result representative of the actual output signal voltage vector of the circuit.

It might be noted that when signal powers in paths 12 and 14 combine at the output junction 18, part of the resultant power enters output arm 26 and part of the resultant power is absorbed by the matched load 28. The vector diagram of FIGURE 2 is for the situation in output arm 26, but a separate vector diagram could be drawn to describe the situation in arm 24 if required. The amount of power absorbed by matched load 28 depends on the respective amplitudes and phase angles of the signals in paths 12 and 14.

It will be apparent that the particular connections of the side arms and the E and H plane arms specified for the junctions of the FIGURE 1 circuit may be interchanged without affecting the operating principle of the device: only the calibration of the device will be altered.

Figures 3, 6:
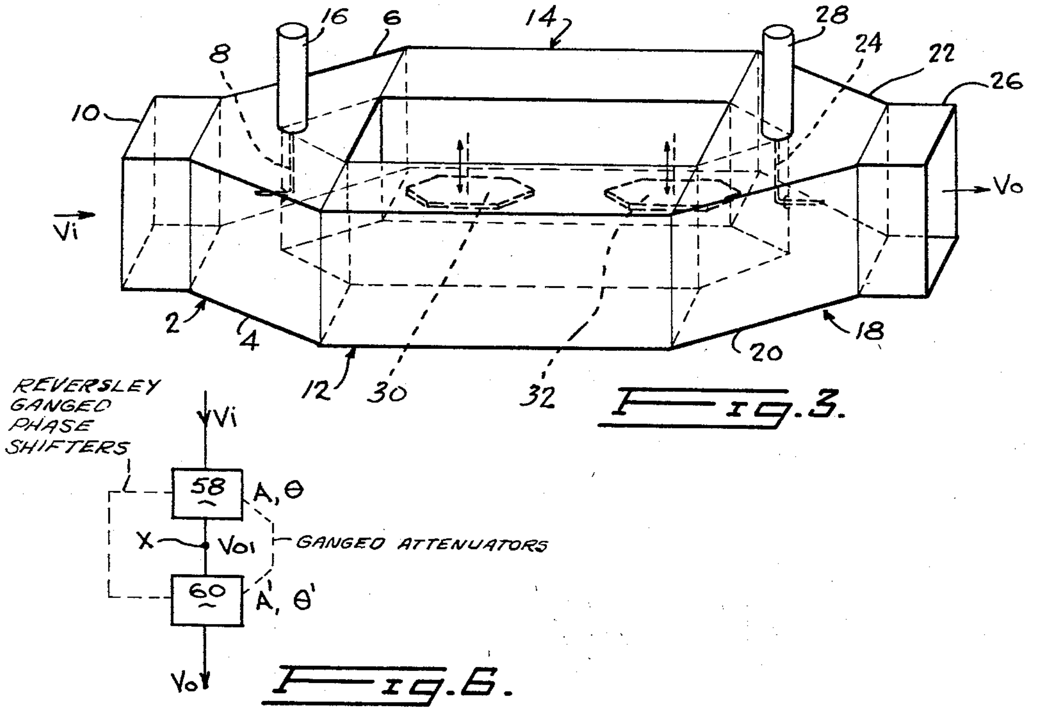
FIGURE 3 is a diagrammatic perspective view of the circuit of FIGURE 1 as embodied in rectangular waveguide.
FIGURE 6 is a block diagram for another embodiment of the invention employing two of the circuits of FIGURE 1 connected in series.

The circuit of FIGURE 1 may be constructed from individual items of broadband commercially available waveguide or coaxial equipment, or it may be manufactured as a single unit. FIGURE 3 shows an example of the circuit of FIGURE 1 as embodied in a single unit constructed of rectangular waveguide, like numerals representing like parts. Phase shifter 32 is shown as a movable dielectric block and attenuator 30 is shown as a movable resistance plate. Arm 8 is shown as a coaxial coupling rather than a waveguide port, and so is arm 24 of the output junction 18.

Figure 4:
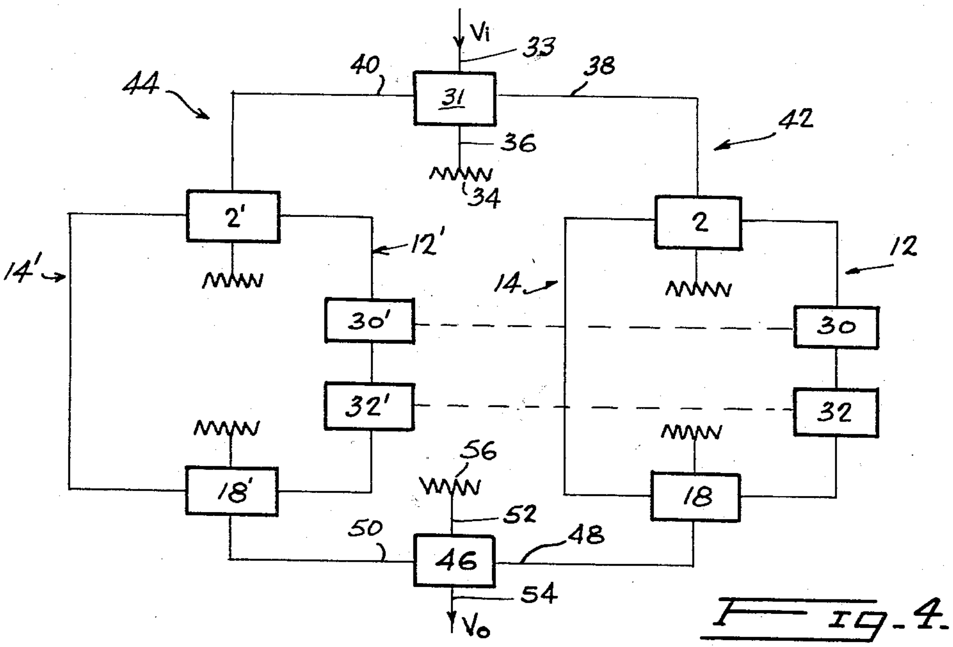
FIGURE 4 is a circuit diagram for another embodiment of the invention employing two of the circuits of FIGURE 1 connected in parallel.

If a fine attenuator with substantially zero phase shift over its entire range of operation is desired, two of the circuits of FIGURE 1 may be connected in parallel, as shown in FIGURE 4. Here an input magic tee junction 31 is shown having input signal $V_i$ supplied to its H plane arm 33 and a matched load 34 coupled to its E plane arm 36. Each of side arms 38 and 40 of the input junction has coupled thereto a transmission path 42, 44, respectively. An output junction 46 is also shown, having a pair of side arms 48 and 50, an E plane arm 52 and an H plane arm 54. Transmission path 42 is coupled to arm 48; transmission path 44 is coupled to arm 50, arm 52 is terminated by a matched load 56, and arm 54 provides the output signal from the circuit.

In each of transmission paths 42 and 44 is connected a circuit of the type shown in FIGURE 1, both such circuits being identical and that connected in path 44 being denoted by primed reference numerals for purposes of description.

Figures 5, 7:
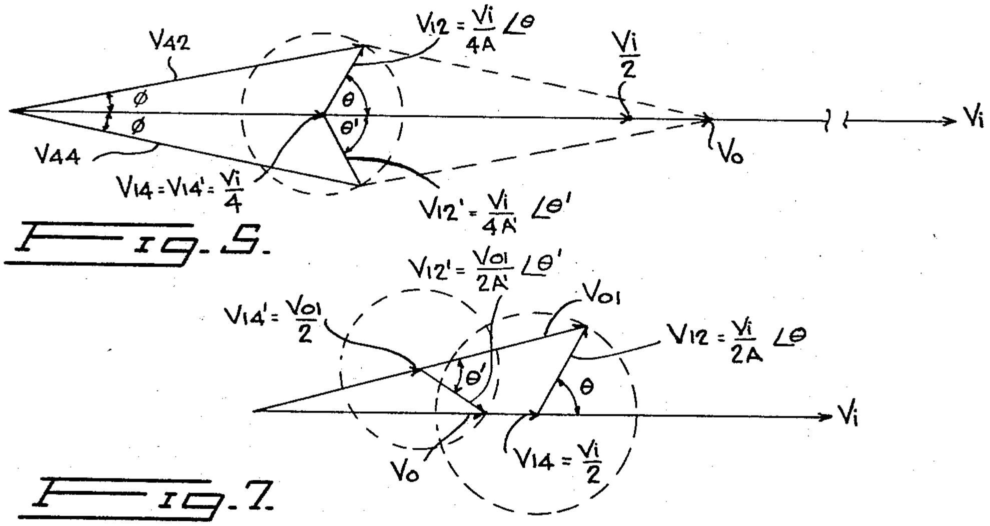
FIGURE 5 is a vector diagram for calculating an output signal of the circuit of FIGURE 4.
FIGURE 7 is a vector diagram for calculating an output signal of the circuit of FIGURE 6.

A vector diagram for calculating the phase angle and amplitude of a vector $V_o$ indicative of the voltage vector at output arm 54 of the FIGURE 4 circuit is shown in FIGURE 5. Signal $V_i$ is supplied at input arm 33 and divides equally in power between transmission paths 42 and 44. In path 42 the power divides again between transmission limbs 12 and 14 of the FIGURE 1 circuit connected therein, signal in limb 12 suffering an attenuation A and a phase shift $\theta$. For purposes of the vector diagram, the resultant signal at output arm 54 as a result of signal in transmission path 42 is shown as $V_{42}$, where $V_{42}$ is the result of vectorial addition of vectors $$V_{14}=\frac{V_i}{4}$$

and $$V_{12}=\frac{V_i}{4A}\underline{/\theta}$$

as in the FIGURES 1 and 2 case. Similarly power in transmission path 44 divides between transmission limbs 12' and 14' and the resultant signal at arm 54 as a result of signal in path 44 may be represented as $V_{44}$, where $V_{44}$ is a result of vectorial addition of vectors $$V_{14'}=\frac{V_i}{4} \text{ and } V_{12'}=\frac{V_i}{4A'}\underline{/\theta'}$$

Final output vector $V_o$ is the vectorial sum of vectors V42 and V44. It is evident that provided attenuations A and A' are maintained equal, and phase shifts $\theta$ and $\theta'$ are maintained equal and opposite, this being the situation shown in FIGURE 5, output signal vector $V_o$ will undergo no variation in phase as its amplitude is varied by adjustment in unison of phase shifters 32 and 32'.

To ensure that attenuation A and A' are maintained equal, attenuators 30 and 30' may be ganged, as shown diagrammatically in FIGURE 4. Similarly, to ensure that phase shifts $\theta$ and $\theta'$ are maintained equal and opposite, appropriate control means may be provided for ganging phase shifters 32 and 32' to obtain equal and opposite adjustment of the phase shifters. The ganging of the phase shifters 32 and 32' is shown diagrammatically in FIGURE 4. Of course the FIGURE 4 circuit could be operated without ganging the attenuators together and the phase shifters together, in a mode such that attenuations A and A' were not maintained equal and phase shifts $\theta$ and $\theta'$ were not maintained equal and opposite. In that case, as the amplitude of the output signal were varied by adjustment for example of one or both of the phase shifters 32 and 32, there would be an accompanying change in the phase of the output signal.

As an alternative to the circuit of FIGURE 4, a substantially phase shift free variable attenuator may be obtained by connecting two circuits of FIGURE 1 in series instead of in parallel. This situation is shown in FIGURE 6, the circuits of FIGURE 1 that are connected in series being represented in block diagram form by reference numerals 58 and 60, respectively. Circuit 58 is assumed to have a phase shifter 32 and attenuator 30 providing phase shift $\theta$ and attenuation A respectively, while circuit 60 is assumed to have similar elements 32' and 30' respectively providing phase shift $\theta'$ and attenuation A'. Input signal to the FIGURE 6 circuit is $V_i$, output signal is represented by symbol $V_o$ for vector diagram purposes, and signal at point X between circuits 58 and 60 is represented by symbol $V_{o1}$.

The vector diagram of FIGURE 7 shows a method for deriving vector $V_o$. Vector $V_{o1}$ is first computed, exactly as in the FIGURE 2 diagram, as a vectorial sum of vectors $V_{12}$ and $V_{14}$. Then vector $V_{o1}$ is treated as if it were the input signal $V_i$ for circuit 60 and the procedure is repeated, i.e., vector $V_{14}$ is derived by marking the midpoint of vector $V_{o1}$ and vector $V_{12}$, is drawn from the tip of vector $V_{14}$, with length $V_{o1}/2A'$ and angle $\theta'$ in relation to vector $V_{o1}$. Vector addition of vectors $V_{14'}$ and $V_{12'}$ results in vector $V_o$ indicative of the actual output signal vector of the circuit. If attenuations A and A' are made equal and phase shifts $\theta$ and $\theta'$ are made equal and opposite (which is the situation shown in FIGURE 7), the triangle bounded by vectors $V_{14}$, $V_{12}$ and $V_{01}$ is similar to the triangle bounded by vectors $V_{14'}$, $V_{12'}$, and $V_o$, and hence output signal vector $V_o$ has a substantially constant phase with respect to the input signal $V_i$. Thus adjustment of phase shifters 32 and 32' in unison to ensure equal and opposite phase shifts $\theta$ and $\theta'$, attenuations A and A' being preset to be equal, will vary the length of output vector $V_o$ but will produce substantially no variation in its phase angle.

In the FIGURE 6 circuit, attenuators 30 and 30' may be ganged as in the FIGURE 4 arrangement to ensure equality of attenuations A and A', and phase shifters 32 and 32' may be appropriately ganged as in the FIGURE 4 arrangement to ensure that phase shifts $\theta$ and $\theta'$ are maintained equal and opposite. Alternatively the FIGURE 6 circuit may be operated without keeping attenuations A and A' equal, and phase shifts $\theta$ and $\theta'$ equal and opposite, in which case variation of the amplitude of the output signal by control of the circuit will also result in variation of the phase of the output signal.

In the foregoing description of the operation of these circuits, for example the FIGURE 1 circuit, it has been assumed that to produce incremental changes in the vector value of an output signal, the attenuator 30 is preset and phase shifter 32 is used as the variable control. The circuit could be operated by presetting the phase shifter 32 and adjusting the attenuator 30 to obtain incremental attenuation or phase shift of the output signal over a selected range, but it is preferred that the phase shifter be used as the variable control because of the particularly precise control obtainable thereby, as previously explained.

Figure 8:
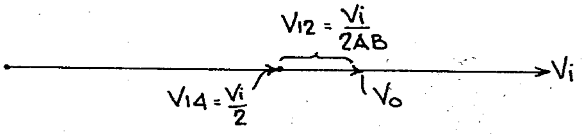
FIGURE 8 is a vector diagram for calculating an output signal of a modification of the circuit of FIGURE 1.

The circuit of FIGURE 1 may be modified by replacing phase shifter 32 by a second attenuator having an attenuation B. Total attenuation in transmission path 12 is then AB, and there is no phase shift of signal in path 12 (except for that inherent in the attenuators and this is ignored for purposes of the present explanation). FIGURE 8 shows a vector diagram for this modification, vector $V_{14}$ being as before of length $V_i/2$ and vector $V_{12}$ being now of length $V_i/2AB$ and in phase with vector $V_{14}$. The length of vector V may be varied by presetting attenuation A at a relatively high value and then adjusting attenuation B over a wide range. Since such variation of attenuation B will only slightly influence output vector $V_o$, fine incremental control of the amplitude of the output signal will thus be achieved. However no control of the phase angle of the output voltage can be achieved with the modification just described.

We claim:

1. A microwave circuit for producing controlled incremental changes in an output signal thereof, comprising:
- (a) input means for receiving and dividing an input signal,
- (b) output means,
- (c) a pair of transmission paths each having an input and coupled to said input means to receive a respective portion of said input signal and each having an output end coupled to said output means for the signals in said paths to combine at said output means as an output signal,
- (d) each said transmission path including:
  - (i) first junction means coupled to said input end for dividing the signal at the input end of said transmission path,
  - (ii) second junction means coupled to said output end,
  - (iii) a pair of transmission limbs each having one end coupled to said first junction to receive a respective part of the signal in said transmission path and each having its other end coupled to said second junction for the signals in said limbs to combine at said second junction as a signal to the output end of said transmission path,
  - (iv) one of said transmission limbs containing therein attenuation means constituted by a wholly passive element and phase shifting means constituted by a wholly passive element in series with said attenuation means, at least one of said attenuation means and phase shifting means being independently variable.

2. A microwave circuit according to claim 1 wherein the other of said transmission limbs comprises substantially a direct conducting path between said ends thereof.

3. A microwave circuit for producing controlled incremental changes in the amplitude of an output signal thereof with substantially no variation in phase of said output signal, comprising:
- (a) input means for receiving and dividing into equal portions an input signal,
- (b) output means,
- (c) a pair of transmission paths each having an input end coupled to said input means to receive a respective one of said portions of said input signal and each having an output end coupled to said output means for the signals in said paths to combine at said output means as an output signal,
- (d) each said transmission path including:
  - (i) first junction means coupled to said input means for dividing into equal parts the signal at the input end of said transmission path,
  - (ii) second junction means coupled to said output end,
  - (iii) a pair of transmission limbs each having one end coupled to said first junction to receive a respective one of said parts of the signal in said transmission path and each having its other end coupled to said second junction for the signals in said limbs to combine at said second junction as a signal to the output end of said transmission path,
  - (iv) one of said transmission limbs containing therein variable attenuation means constituted by a wholly passive element and independently variable phase shifting means constituted by a wholly passive element in series with said attenuation means,
  - (v) the other of said transmission limbs comprising substantially a direct conducting path between said ends thereof,
- (e) means for controlling in unison said attenuation means of each transmission path for the attenuations thereof to be equal during their variation,
- (f) and means for controlling in unison said phase shifting means of each transmission path for the phase shifts thereof to be equal and opposite during their variation.

4. A microwave circuit for producing controlled incremental changes in an output signal thereof, comprising:
- (a) first input means for receiving and dividing an input signal,
- (b) first output means,
- (c) a first pair of transmission paths each having one end coupled to said first input means to receive a respective portion of said first input signal and each having its other end coupled to said first output means for the signals in said paths to combine at said first output means as a first output signal,
- (d) one of said transmission paths containing therein first attenuation means constituted by a wholly passive element and first phase shifting means constituted by a wholly passive element in series with said first attenuation means, at least one of said attenuation means and phase shifting means being independently variable for providing varying changes in said first output signal,
- (e) second input means coupled to said first output means for receiving and dividing said first output signal, (f) second output means, (g) a second pair of transmission paths each having one end coupled to said second input means to receive a respective portion of said first output signal and each having its other end coupled to said second output means for the signals in the paths of said second pair to combine at said second output means as an output signal of said circuit, (h) one of said transmission paths of said second pair containing therein second attenuation means constituted by a wholly passive element and second phase shifting means constituted by a wholly passive element in series with said second attenuation means, at least one of said second attenuation means and said second phase shifting means being independently variable for providing varying changes in said output signal.

5. A microwave circuit for producing controlled incremental changes in the vector value of an output signal thereof, comprising:

(a) first input means for receiving and dividing in equal portions an input signal, (b) first output means, (c) a first pair of transmission paths each having one end coupled to said first input means to receive a respective one of said portions of said first input signal each having its other end coupled to said first output means for the signals in said paths to combine at said first output means as a first output signal, (d) one of said transmission paths containing therein first variable attenuation means constituted by a wholly passive element and first phase shifting means constituted by a wholly passive element in series with said first attenuation means and variable independently thereof, (e) the other of said transmission paths comprising substantially a direct conducting path between the ends thereof, (f) second input means coupled to said first output means for receiving and dividing into equal portions said first output signal, (g) second output means, (h) a second pair of transmission paths each having one end coupled to said second input means to receive a respective one of said portions of said first output signal and each having its other end coupled to said second output means for the signals in the paths of said second pair to combine at said second output means as an output signal of said circuit, (i) one of said transmission paths of said second pair containing therein second variable attenuation means constituted by a wholly passive element and second phase shifting means constituted by a wholly passive element in series with said second attenuation means and variable independently thereof, (j) the other of said transmission paths of said second pair comprising substantially a direct conducting path between the ends thereof, (k) means for controlling in unison said first and second attenuation means for the attenuations thereof to be equal during their variation, (l) and means for controlling in unison said first and second phase shifting means for the phase shifts thereof to be equal and opposite during their variation.

References Cited

UNITED STATES PATENTS

| | | | |
|---|---|---|---|
| 2,236,134 | 3/1941 | Gloess. | |
| 2,951,996 | 9/1960 | Pan | 333—11 X |
| 3,160,887 | 12/1964 | Broussaud et al. | 343—777 |

OTHER REFERENCES

"Technique of Microwave Measurements," (MIT Radiation Laboratory Series) Montgomery, McGraw-Hill, New York and London, 1947, pp. 570–571 relied on.

ELI LIEBERMAN, *Primary Examiner.*

M. NUSSBAUM, *Assistant Examiner.*